(12) United States Patent
Ruehrnoessl et al.

(10) Patent No.: US 8,546,727 B2
(45) Date of Patent: Oct. 1, 2013

(54) CONTACT TUBE FOR A WELDING TORCH

(75) Inventors: Manfred Ruehrnoessl, Linz (AT);
Harald Noebauer, Piberbach (AT);
Markus Steinmaurer, Kremsmuenster (AT)

(73) Assignee: FRONIUS International GmbH, Pettenbach (AT)

( * ) Notice: Subject to any disclaimer, the term of this patent is extended or adjusted under 35 U.S.C. 154(b) by 368 days.

(21) Appl. No.: 12/736,628

(22) PCT Filed: May 25, 2009

(86) PCT No.: PCT/AT2009/000216
§ 371 (c)(1),
(2), (4) Date: Oct. 25, 2010

(87) PCT Pub. No.: WO2010/000002
PCT Pub. Date: Jan. 7, 2010

(65) Prior Publication Data
US 2011/0036821 A1    Feb. 17, 2011

(30) Foreign Application Priority Data
Jun. 30, 2008   (AT) ................. A 1034/2008

(51) Int. Cl.
*B23K 9/00* (2006.01)
(52) U.S. Cl.
USPC ............. 219/136; 219/137 R; 219/137 PS; 219/137 WM; 219/137.2; 219/138
(58) Field of Classification Search
CPC .................................. B23K 9/00; B23K 9/123
USPC ............................................. 219/136–137.9
See application file for complete search history.

(56) References Cited

U.S. PATENT DOCUMENTS 2,653,181 A * 9/1953 Millett .................... 248/27.1
3,290,480 A * 12/1966 Fiedler et al. ............ 219/136
(Continued)

FOREIGN PATENT DOCUMENTS

EP  1 266 714   12/2002
JP  11277242    10/1999
(Continued)

OTHER PUBLICATIONS

International Search Report.
(Continued)

*Primary Examiner* — Henry Yuen
*Assistant Examiner* — Brett Spurlock
(74) *Attorney, Agent, or Firm* — Collard & Roe, P.C.

(57) ABSTRACT

The invention relates to a contact tube (29) for a welding torch (10), having a longitudinal axis (31) along which a through-opening (30) for guiding a welding wire (13) from an inlet region (37) to an outlet region (35) and from an outlet opening (39) towards a workpiece (16) is provided, wherein at least one slot (34) is provided in the outlet region (35) for making contact with the welding wire (13). A contact tube (29) with improved contacting of the welding wire (13) is obtained by providing at least one further slot (36) in the inlet region (37) of the contact tube (29), wherein the slot (36) in the inlet region (37) is arranged in line with the slot (34) in the outlet region (35), and a web (38), which serves as a pivot point, is formed between the slot (34) in the outlet region (35) and the at least one slot (36) in the inlet region (37).

12 Claims, 7 Drawing Sheets

(56) References Cited

U.S. PATENT DOCUMENTS

| | | | |
|---|---|---|---|
| 3,825,720 A | 7/1974 | Zillinger, Jr. | |
| 4,016,398 A * | 4/1977 | Herrick | 219/137.41 |
| 4,988,846 A * | 1/1991 | Karlsten et al. | 219/137.61 |
| 5,721,417 A * | 2/1998 | Craig | 219/137.43 |
| 6,307,179 B1 * | 10/2001 | Walters, III | 219/137.42 |
| 6,559,416 B1 | 5/2003 | Steenis et al. | |
| 6,710,300 B2 | 3/2004 | Steenis et al. | |
| 6,924,461 B2 * | 8/2005 | Matiash | 219/137.42 |
| D535,166 S * | 1/2007 | Kensrue et al. | D8/30 |
| 7,244,909 B2 * | 7/2007 | Kensrue et al. | 219/137.31 |
| 7,271,366 B2 * | 9/2007 | Kensrue | 219/137.61 |
| 7,381,923 B2 * | 6/2008 | Gordon et al. | 219/137.61 |
| 7,544,914 B2 * | 6/2009 | Zamuner | 219/137.41 |
| 2003/0127444 A1 * | 7/2003 | Steenis et al. | 219/137.61 |
| 2004/0074888 A1 * | 4/2004 | Matiash | 219/137.42 |
| 2005/0218132 A1 * | 10/2005 | Wells | 219/137.61 |
| 2006/0226136 A1 * | 10/2006 | Zamuner | 219/137.41 |
| 2009/0068606 A1 * | 3/2009 | Tsai | 431/255 |
| 2010/0038345 A1 | 2/2010 | Nishimura | |

FOREIGN PATENT DOCUMENTS

| | | |
|---|---|---|
| JP | 2004-001088 | 1/2004 |
| WO | WO 2006/046799 | 5/2006 |
| WO | WO 2008/018594 | 2/2008 |

OTHER PUBLICATIONS

Austrian Search Report dated Feb. 11, 2009 with English translation of relevant parts.

* cited by examiner

CONTACT TUBE FOR A WELDING TORCH

CROSS REFERENCE TO RELATED APPLICATIONS

This application is the National Stage of PCT/AT2009/000216 filed on May 25, 2009, which claims priority under 35 U.S.C. §119 of Austrian Application No. A 1034/2008 filed on Jun. 30, 2008, the disclosure of which is incorporated by reference. The international application under PCT article 21(2) was not published in English.

BACKGROUND OF THE INVENTION

1. Field of the Invention

The invention relates to a contact tube for a welding torch, having a longitudinal axis, along which a continuous opening is provided for guiding a welding wire from an inlet area to an outlet area and from an outlet opening in the direction of a workpiece, at least one slot being provided in the outlet area for contacting the welding wire.

All supplementary materials for greatly varying welding methods are included under the term welding wire.

2. Description of the Related Art

Manifold contact tubes for welding torches are known from the prior art, which are provided with at least one slot in the area of the outlet opening for the welding wire. In this way, the contact tube becomes flexible in the area of the at least one slot, so that the diameter of the outlet opening can be reduced. A contact force can thus be exerted for contacting the welding wire. Various methods are known for achieving this contact force.

For example, a contact tube for a welding torch, which is provided with two slots, is known from EP 1 266 714 A1. The opening for conveying the welding wire is constricted with the aid of a ring, which is pushed over the contact tube in the area of the slots. It is disadvantageous in this case that no readjustment of the contact force is possible, and the outlet opening is expanded again by the resulting abrasion of the welding wire in the contact tube and the set contact force thus can no longer be maintained.

A contact tube for a welding torch is also known from U.S. Pat. No. 6,710,300 B2, by which the contacting of a welding wire is to be improved. This is performed in particular by exerting a contact force on the welding wire, in that a part of the contact tube which is provided with two slots is pressed using a spring against a fixed body. It is disadvantageous in this case that the mobility is restricted by the resistance on the fixed body, so that the contact force on the welding wire can only be set to a limited extent and increased abrasion of the welding wire is caused. Furthermore, the replacement of the contact tube is connected with an increased time expenditure, since additional connections of elements to the contact tube must be detached.

JP 2004001088 A and WO 2008/018594 A1 describe contact tubes for welding torches, which have, in addition to the slot which runs in the longitudinal direction, vertically situated slots in the outlet area of the welding wire, by which an adaptation of the contact tube to the welding wire can be improved.

SUMMARY OF THE INVENTION

The object of the present invention comprises providing the most consistent and permanent contacting of the welding wire possible over the service life of a contact tube of a welding torch. Disadvantages of known contact tubes are to be prevented or at least reduced.

This object is achieved in that at least one further slot is provided in the inlet area, the slot in the inlet area and the slot in the outlet area being situated aligned, and a web which is used as a pivot point being formed between the slot in the outlet area and the at least one slot in the inlet area. Through the aligned configuration of the slot in the inlet area and the slot in the outlet area, mirror-inverted movement of the parts of the contact tube on both sides of the slots is made possible. It is advantageous in this case that the contact force required for the contacting is automatically readjusted, in that a fixed pre-tension is set in the inlet area of the contact tube. The welding wire can thus be permanently contacted during a welding process, whereby the welding quality is increased. The outlet area is flexible and/or movable due to the slot, whereby the contact tube can be used for various welding wire diameters, within a specific range. The contact force can thus be adapted optimally to the material and the diameter of the respective welding wire. Furthermore, this has the advantage that the conveyance force for the welding wire can be kept minimal and simultaneously an optimum current transfer to the welding wire is ensured. The abrasion of the welding wire and also the abrasion of the opening in the contact tube are thus minimal and/or are compensated for by this flexible closure part, so that permanent contacting of the welding wire is provided. Furthermore, the contact tube can be replaced rapidly and easily.

The slot in the outlet area is advantageously situated running along the longitudinal axis up to in front of the outlet opening of the contact tube and subsequently diagonally to the longitudinal axis, so that two jaws which differ in their shape are formed on both sides of the slot. Through such guiding of the slot in the outlet area of the contact tube, protection from contaminants, such as welding spatters, is provided, since the slot does not represent a direct engagement surface.

One jaw is advantageously implemented as essentially L-shaped and encloses the outlet opening for the welding wire.

According to a further feature of the invention, a contact area, which is adaptable to the diameter of the welding wire, is provided for contacting a welding wire in the outlet area of the contact tube, and the opening of the contact tube is implemented up to the contact area in such a manner that the welding wire can be guided essentially free running from the inlet area up to the contact area in the outlet area. Secure or permanent contacting of the welding wire is thus achieved, since the contact area essentially does not change and a constant electric arc is thus also ensured.

According to a further design of the contact tube, a ring-shaped expansion, having an external diameter greater than the remaining external diameter of the contact tube, is provided in the inlet area, and a stop surface is implemented on the side of the expansion oriented toward the outlet opening. This stop surface offers a hold for a fastener, via which the contact tube can be connected to the welding torch.

The inner surface of the ring-shaped expansion is preferably implemented as tapering conically toward the opening of the contact tube to receive a corresponding conical adapter part for fastening on the welding torch. By receiving a corresponding conical adapter part in this conical inner surface of the ring-shaped expansion, the contact tube can be spread apart in the inlet area and moved toward one another in the outlet area as a result. This is made possible by the mobility of the contact tube by the configuration of the slots according to the invention in the inlet area and outlet area. Through the mobility of the contact tube, better regulation and transmission of the contact force to the welding wire is also caused.

It is also advantageous if the inner surface of the ring-shaped expansion is implemented as curved. The contact between the corresponding conical adapter part and the contact tube is thus improved, from which better current transfer and better heat dissipation also result.

A union nut is advantageously provided for fastening the adapter part, so that the inlet area is spread apart by the conical adapter part and the jaws are moved toward one another in the outlet area as a result.

The union nut can be implemented so that it is situated as a protective envelope over the outlet area of the contact tube.

When the outlet area of the contact tube is implemented as conically tapering toward the outlet opening, a reduction of the area for the adhesion of welding spatters can be achieved. The union nut is also optionally implemented as conical in this area.

According to one embodiment, the adapter part has a hole for the welding wire, a cone on the side for use on the conical inner surface, and an external thread on the side diametrically opposing the cone for connection to the welding torch. Through an adapter part implemented in this manner, the contact tube can be used for arbitrary welding torches, since the adapter part is usable as an adapter.

An external thread for connection to a corresponding internal thread of the union nut is preferably situated on the side of the cone of the adapter part.

BRIEF DESCRIPTION OF THE DRAWINGS

The present invention is explained in greater detail on the basis of the appended schematic drawings.

In the figures.

DETAILED DESCRIPTION OF PREFERRED EMBODIMENTS

Figure 1:
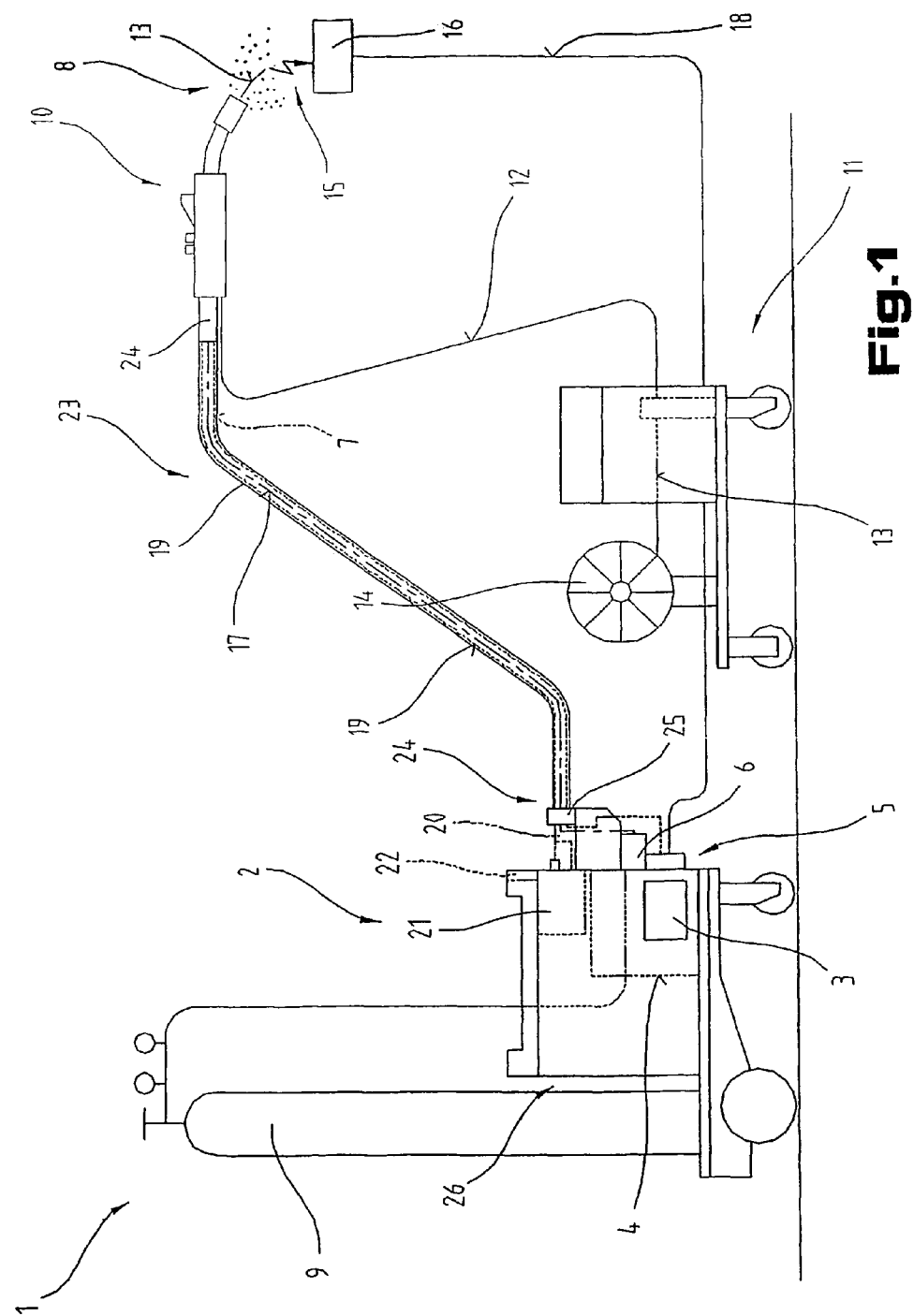
FIG. 1 shows a schematic view of a welder.

For introductory purposes, it is noted that identical parts of the variants and embodiments are provided with identical reference numerals.

FIG. 1 shows a welder 1 or a welding system for greatly varying processes or methods, such as MIG/MAG welding or WIG/TIG welding or electrode welding methods, double wire/tandem welding methods, plasma or soldering methods, etc.

The welder 1 comprises a power source 2 having a power unit 3, a control device 4, and a switching element 5, which is assigned to the power unit 3 and/or the control device 4. The switching element 5 and/or the control device 4 is connected to a control valve 6, which is situated in a supply line 7 for a gas 8, in particular a protective gas such as $CO_2$, helium, argon, or the like, between a gas reservoir 9 and a welding torch 10.

In addition, a wire feed device 11, which is typical for MIG/MAG welding, can be activated via the control device 4, an auxiliary material or a welding wire 13 being supplied from a storage drum 14 or a wire roll in the area of the welding torch 10 via a supply line 12. Of course, it is also possible that the wire feed device 11, as is known from the prior art, is integrated in the welder 1, in particular in the main housing, and is not implemented as an auxiliary device as shown in FIG. 1.

It is also possible that the wire feed device 11 supplies the welding wire 13 to the processing point outside the welding torch 10, for this purpose, a non-fusing electrode preferably being situated for this purpose in the welding torch 10, as is typical in WIG/TIG welding.

The current for establishing an electric arc 15, in particular a working electric arc, between the non-fusing electrode (not shown) and a workpiece 16 is supplied via a welding line 17 from the power unit 3 of the power source 2 to the welding torch 10, in particular the electrode, the workpiece 16 to be welded, which is also formed from multiple parts, also being connected via a further welding line 18 to the welder 1, in particular to the power source 2, and thus a circuit being able to be established for a process via the electric arc 15 and/or the produced plasma jet.

To cool the welding torch 10, the welding torch 10 can be connected via a cooling loop 19, with a flow monitor 20 interposed, to a liquid container, in particular a water container 21, whereby when the welding torch 10 is put into operation, the cooling loop 19, in particular a liquid pump which is used for liquid situated in the water container 21, being started and thus the welding torch 10 being able to be cooled.

Furthermore, the welder 1 has an input and/or output device 22, via which greatly varying welding parameters, modes of operation, or welding programs of the welder 1 may be set and/or retrieved. The welding parameters, modes of operation, or welding programs which are set via the input and/or output device 22 are relayed to the control device 4 and subsequently the individual components of the welding system or the welder 1 are activated thereby and/or corresponding target values are specified for the regulation or control.

Furthermore, in the illustrated exemplary embodiment, the welding torch 10 is connected via a hose package 23 to the welder 1 or the welding system. The individual lines from the welder 1 to the welding torch 10 are situated in the hose package 23. The hose package 23 is connected via a coupling device 24 to the welding torch 10, while in contrast the individual lines in the hose package 23 are connected to the individual contacts of the welder 1 via terminal sockets or plug connections. In order that an appropriate tension relief of the hose package 23 is ensured, the hose package 23 is connected via a tension relief device 25 to a housing 26, in particular to the main housing of the welder 1. Of course, it is also possible that the coupling device 24 can also be used for the connection to the welder 1.

Fundamentally, it is to be noted that all of the above-mentioned components do not have to be employed or used for the various welding methods or welders 1, such as WIG devices or MIG/MAG devices or plasma devices. For this purpose, for example, it is possible that the welding torch 10 can be implemented as an air-cooled welding torch 10.

Figure 2:
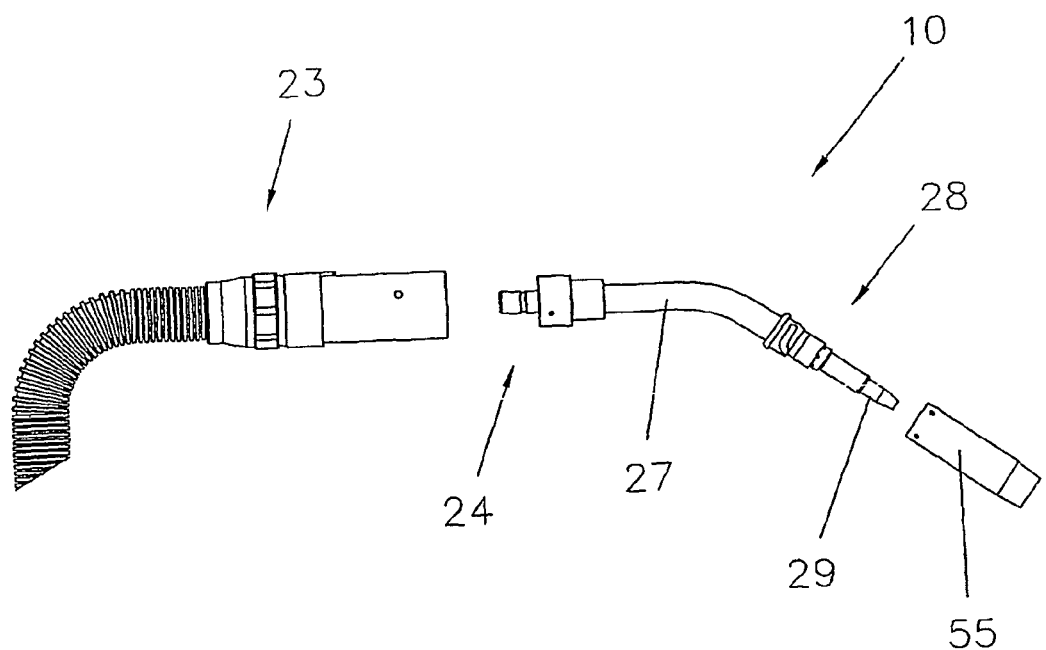
FIG. 2 shows a welding torch in a schematic exploded view.

A greatly simplified construction of a welding torch 10, which is implemented as a MIG torch, is shown in FIG. 2. This exploded view shows the essential components of the welding torch 10, namely the hose package 23, the coupling device 24, a tube elbow 27, a torch body 28 as the current-conducting part, on which finally a contact tube 29 and a gas nozzle 55 are fastened. The hose package 23 is connected via the coupling device 24 to the tube elbow 27 or the welding torch 10.

The hose package 23 can also be connected to a torch handle, which is connected via the coupling device 24 to the tube elbow 27. Such a coupling device 24 can also be used for connecting the hose package 23 to the torch handle. The torch handle can also be implemented as an adapter part however, and thus, for example, the welding torch 10 can be fastened to a robot via the adapter part.

The tube elbow 27 contains, inter alia, cooling ducts, supply lines for the electrical power, supply lines for the gas 8, and in particular the supply line 12 or feed device 12 for the welding wire 13, the so-called core or wire core, this being supplied to the tube elbow 27 via the hose package 23. The welding wire 13 is therefore conveyed from the storage drum 14 via the feed device 12 or via a corresponding inner hole in the feed device 12 up to the contact tube 29. This is performed at least by the wire feed unit 11. In the contact tube 29, the welding wire 13 is supplied with electrical power, so that an arc welding process can be performed. Accordingly, the contact tube 29 is manufactured from an electrically conductive and essentially wear-proof material, such as copper, copper alloys (tungsten), etc.

Figure 3:
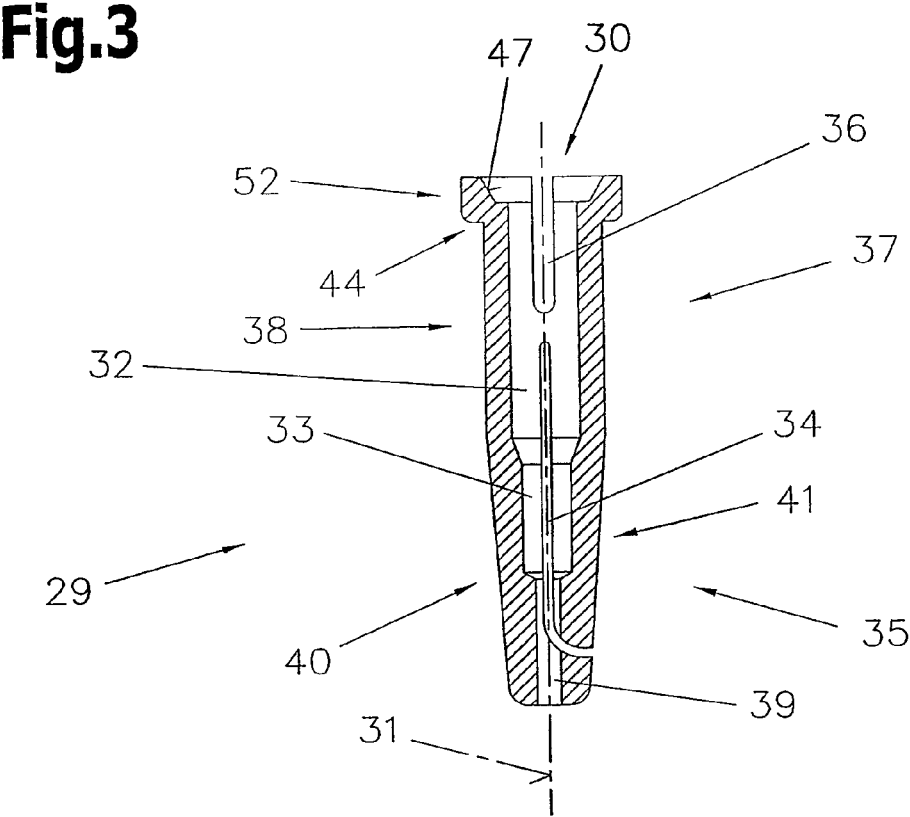
FIG. 3 shows a sectional view of a first embodiment of a contact tube according to the invention.

As is known from the prior art, the contact tube 29 has a continuous axial opening 30 along a longitudinal axis 31 of the contact tube 29, the opening 30 being able to be divided, for example, into a guide hole 32, a hole 33, and an outlet opening 39 for the welding wire 13—as shown below in FIG. 3. For a stable welding process, it is significant that the contacting of the welding wire 13 always occurs as much is possible in the outlet opening 39, the welding wire 13 being able to run freely over at least a short distance up to there, for example, the length of the hole 33. The guide hole 32 in the contact tube 29 can also be dispensed with, of course. In these cases, the feed device or wire core 12 already essentially ends in the torch body 28, i.e., before the welding wire 13 enters the contact tube 29. The welding wire 13 accordingly runs freely up to the outlet opening 39, since the hole 33 is implemented as substantially larger than the diameter of the welding wire 13. Therefore, no contacting of the welding wire 13 with the material of the contact tube 29 typically occurs in the area of the hole 33, and therefore also no premature current transfer.

According to the invention, the contact tube 29 is implemented correspondingly, to be able to achieve the contacting, which is required for a stable welding process, by a force on the welding wire. The exertion of the force can be supported by additional auxiliary means. Through the contact tube 29 according to the invention it is ensured that the welding wire 13 is always contacted at the same point and permanently.

The contact tube 29 according to the invention is also implemented so that it can replace a typical contact tube, which is fastened using a screw connection to the torch body 28.

An embodiment of the contact tube 29 is shown schematically in a sectional view in FIGS. 3 through 9. The contact tube 29 according to the invention has a slot 34 in the outlet area 35 and a slot 36 in the inlet area 37. A web 38, which is used as a pivot point, is formed between the slot 34 in the outlet area 35 and the at least one slot 36 in the inlet area 37. The slot 34 in the outlet area 35 runs along the longitudinal axis 31 up to shortly before the outlet opening 39 of the contact tube 29 and subsequently diagonally to this axis. Therefore, two different jaws 40, 41 result in the outlet area 35, one jaw 40 being implemented as essentially L-shaped and containing the outlet opening 39. It is important that the contact tube 29 is further implemented in one piece.

Figure 4:
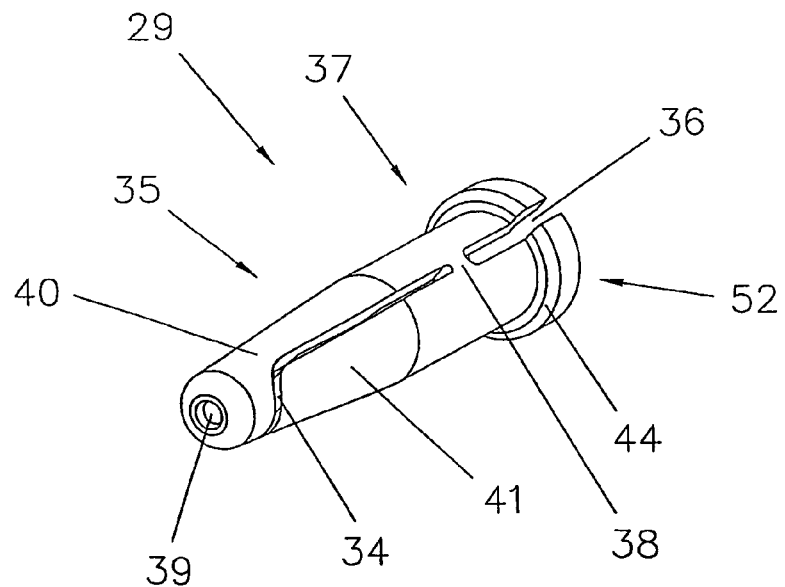
FIG. 4 shows a perspective view of the contact tube according to FIG. 3.
Figure 5:
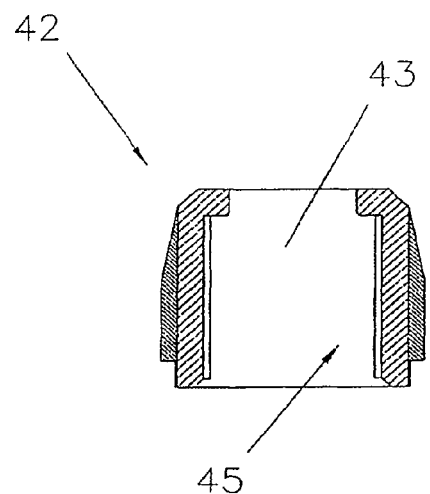
FIG. 5 shows a sectional view of a union nut for fastening the contact tube on a welding torch.
Figure 6:
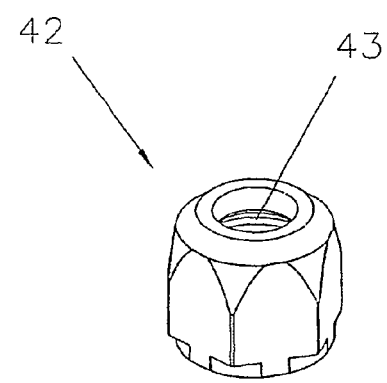
FIG. 6 shows a perspective view of the union nut according to FIG. 5.
Figure 7:
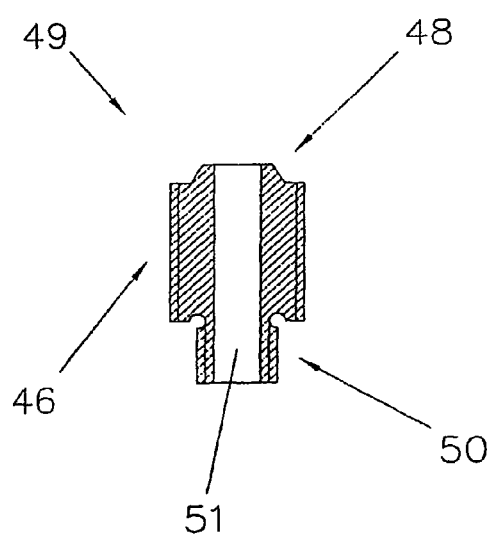
FIG. 7 shows a sectional view of an adapter part for fastening the contact tube on the welding torch.
Figure 8:
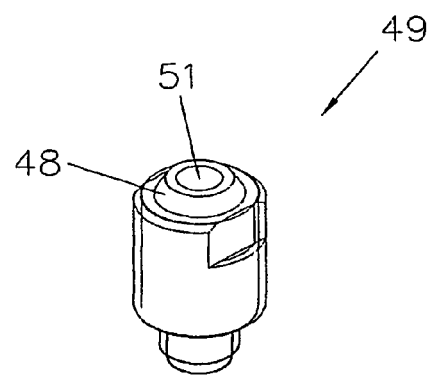
FIG. 8 shows a perspective view of the adapter part according to FIG. 7.

The slot 34 in the outlet area 35 and the slot 36 in the inlet area 37 are better visible from the perspective view of the contact tube 29 according to FIG. 4. It may also be seen that the slot 34 and the slot 36 are connected and/or separated by a web 38, the web 38 representing the connection between the inlet area 37 and the outlet area 35. The opening 30 of the contact tube 29 is formed by the guide hole 32, the hole 33, and the outlet opening 39. The guide hole 32, the hole 33, and the outlet opening 39 are each situated concentrically having a conical taper. This is significant in particular for a low-friction and centered transition of the welding wire 13 into the outlet opening 39 of the contact tube 29, which is implemented in one piece. It is also essential that the diameters of the hole 33 and the guide hole 32 are selected so that no contacting of the welding wire 13 occurs in the hole 33, but rather first in the outlet opening 39. For example, the diameter of the hole 33 is three to ten times as large as the diameter of the welding wire 13. It is thus achieved by the welding wire 13, which runs freely in the hole 33, that the welding wire 13 is only contacted in the outlet opening 39. This has a positive effect in particular on the material transfer and therefore on the entire welding process, since the welding wire 13 is always contacted at the same point.

In order that the contacting of the welding wire 13 always occurs at the same point, i.e., in the outlet opening 39, the effect of the slot 36 in the inlet area 37 is significant. This essentially allows the introduction of a force onto the contact tube 29 and/or the welding wire 13 running therein. The force on the welding wire 13 can be set using a union nut 42 (described below), which is used for fastening the contact tube 29 to the welding torch 10.

Figure 9:
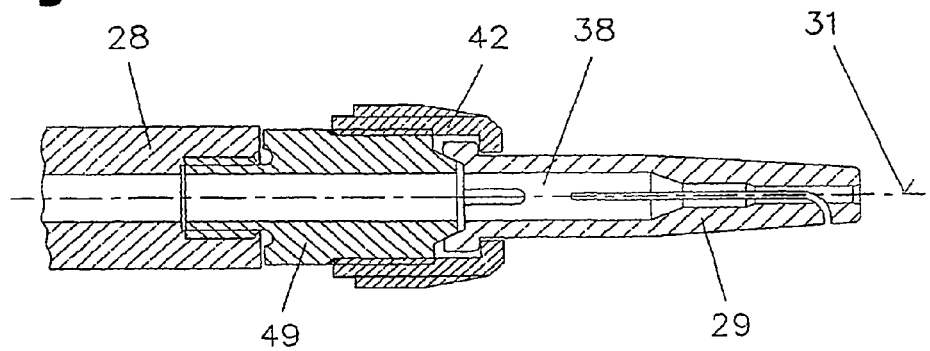
FIG. 9 shows a sectional view of the contact tube, which is situated using the union nut and the adapter part on a torch body of a welding torch, before it is fixed.
Figure 10:
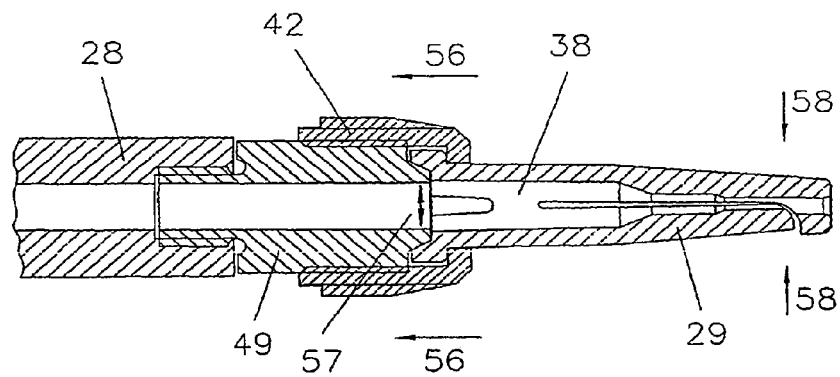
FIG. 10 shows the configuration according to FIG. 9 after corresponding fixing on the torch body.
Figure 11:
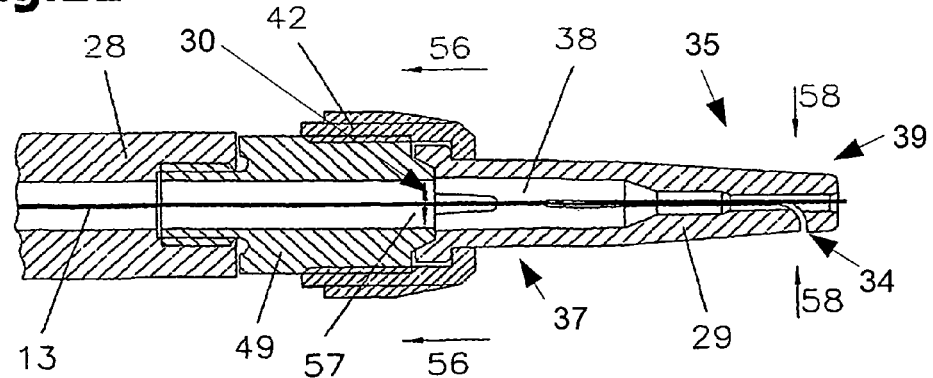
FIG. 11 shows the configuration according to FIG. 10 having a welding wire conveyed in the contact tube.

It is obvious from FIG. 9 that the contact tube 29 is mounted using the union nut 42 on an adapter part 49, which is in turn installed on the torch body 28. In this case, forces still do not act on the contact tube 29 or on the welding wire 13 guided therein. If the contact tube 29 is fastened on the adapter part 49, as shown in FIG. 10, through the force shown by the arrows 56, which results through the complete fastening of the union nut 42, the inlet area 37 is spread apart—as shown by the double arrow 57, and the slot 34 in the outlet area 35 is compressed and/or the jaws 40, 41 are moved toward one another. For complete fastening of the contact tube 29, the union nut 4.2 is rotated until it stops on the stop surface 44 of the ring-shaped expansion 52 of the contact tube 29. The contact tube 29 has a fixed pre-tension, which allows a variable contact force via the mobile or flexible jaws 40, 41. The welding wire 13 is therefore contacted using the optimum contact force essentially over its entire service life of the contact tube 29. The contact force for permanent contacting of the welding wire 13 is shown by the arrows 58. In particular, the jaw 40, which is formed by the slot 34 in the outlet area 35, and the jaw 41 in the area of the outlet opening 39 are moved toward one another, so that a diameter of the outlet opening 39 results which is smaller than the diameter of the welding wire 13. The welding wire 13 conveyed through the outlet opening 39, as shown in FIG. 11, is therefore essentially clamped or the welding wire 13 must press the jaws 40, 41 apart. This causes the welding wire 13 to be permanently contacted at the same point. The outlet area 35 therefore produces a defined contact area having at least two contact points formed from the jaws 40, 41. These contact points are located directly adjacent to the hole 33, i.e., in a first part of the outlet opening 39. The second part of the outlet opening 39 is located in the L-shaped jaw 40, which completely encloses the second part of the outlet opening 39 and is essentially used as a guide for the welding wire 13. This guide can also be insulated correspondingly.

The above-described effect is independent of the direction in which the welding wire 13 is conveyed through the opening 30 of the contact tube 29. The contact tube 29 according to the invention can thus also be used for a CMT (cold metal transfer) welding process, in which the welding wire 13 is conveyed both in the direction of the workpiece 16 and also away from the workpiece 16.

The web 38 is used in such a contact tube 29 as a pivot point and allows the mirror-inverted movement of the parts of the contact tube 29 in the inlet area 37 and outlet area 35. If the inlet area 37 is spread open, the outlet area 35 or the jaws 40, 41 are compressed. The jaws 40, 41 are accordingly movable in the defined contact area. The forces required for this purpose are thus transmitted by the web 38 from the inlet area 37 to the outlet area 35, so that permanent contacting of the welding wire 13 is ensured. The required forces are adapted to the diameter or to a defined range of diameters of the welding wire 13. In general, the forces result from the relationship between the width of the slot 34 and the width of the slot 36. The wider the slot 36 in the inlet area 37, the wider the jaws 40, 41 may move away from one another. In contrast, the width of the slot 34 affects how far apart the jaws 40, 41 may be pressed by the welding wire 13 and for which welding wire diameter the contact tube 29 is designed, or for which range of welding wire diameters it can be used. These relationships are also dependent on the width of the web 38 or the distance between the slot 34 and the slot 36. In the case of a narrow web 38, more force can be transmitted and vice versa. Because of these relationships, the contact tube 29 according to the invention can thus be manufactured, which is adapted to one specific welding wire diameter or to multiple welding wire diameters lying in one range. Permanent contacting can thus be ensured for these welding wires 13.

In addition, however, the exposed slot 34 is not to be contaminated, as is frequently the case by welding spatters, for example. These could also stick together the slot 34, for example, so that the effect according to the invention would no longer be provided. This is solved according to the invention in that the slot 34 only runs along the longitudinal axis 31 essentially up to the middle of the outlet opening 39 and subsequently runs diagonally to the longitudinal axis 31, as already noted. The slot 34 thus runs behind the L-shaped jaw 40 and protects it from contamination.

As already noted, the contact tube 29 is fastened using the union nut 42 on the torch body 28 or on the adapter part 49, since the contact tube 29 according to the invention does not have a separate fastening capability, such as a screw connection or a similar feature. The union nut 42 is described in detail in FIGS. 5 and 6. The union nut 42 can have a hexagon for operation using a corresponding tool.

Fundamentally, the union nut 42 has the form of a dome nut, which on one side has an opening 43 having a diameter, which corresponds to the external diameter of the contact tube 29, so that the union nut 42 can be pushed over the outlet area 35 of the contact tube 29 up to a stop surface 44. The stop surface 44 is situated in the inlet area 37 or directly forms the beginning of the inlet area 37. The contact tube 29 has, in the inlet area 37, a ring-shaped expansion 52, whose diameter is greater than the external diameter of the remaining contact tube 29. The diameter of the stop surface 44 is greater than the external diameter of the contact tube 29, the diameter of the stop surface 44 corresponding to the internal diameter of the union nut 42. The contact tube 29 can thus be fastened by the union nut 42 on the torch body 28. This is preferably performed by a corresponding internal thread 45 in the union nut 42 and an external thread 46 corresponding thereto on the torch body 28. The ring-shaped expansion 52 of the contact tube 29 has an inner surface 47, which is implemented as conical toward the opening 33 of the contact tube 29. This conical inner surface 47 is required to achieve the desired spreading of the inlet area 37. For this purpose, a conical adapter part 49 corresponding to the conical inner surface 47 is provided. The cone 48 of the adapter part 49 has a minimally greater diameter than the inner diameter of the ring-shaped expansion 52. When the union nut 42 and thus the contact tube 29 is screwed onto the torch body 28, the slot 36 is thus pressed or spread apart in the inlet area 37. This in turn causes the jaws 40, 41 in the outlet area 35 to move toward one another and a permanent contact of the welding wire 13 to be achieved. The union nut 42 accordingly exerts a force via the cone 48 of the adapter part 49 on the contact tube 29, through which a contact force results in the outlet area 35, as was already described in detail. This contact force finally allows the permanent contacting of the welding wire 13.

Of course, the stop surface 44 can also be in the area of the web 38, the conical inner surface 47 always being maintained directly at the beginning of the inlet area 37. The height of the ring-shaped expansion 52 is varied accordingly. Therefore, the placement of the stop surface 44 on the contact tube 29 is preferably adapted to the configuration of the contact tube 29 in the welding torch 10, the number of the contact tubes 29 in the welding torch 10, etc. The configuration of the stop surface 44 is dependent in particular on the type of the welding torch 10 and is adapted accordingly thereto.

It is also dependent on the type of the torch 10 whether the torch body 28 has a corresponding external thread 46 for receiving the union nut 42. However, it is currently the case in commercially-available welding torches 10 that they have an internal thread in the torch body 28 instead of the required external thread 46.

Accordingly, the use of the adapter part 49 is necessary, which is screwed into the commercially-available internal thread of the burner body 28 and has the external thread 46 required for receiving the union nut 42. For such a screw connection, corresponding notches are provided on the adapter part 49, so that it can be fastened using an open-ended wrench or the like, for example. Therefore, nearly any commercially-available welding torch 10 can be retrofitted with the contact tube 29 according to the invention using the adapter part 49 according to the invention. The adapter part 49 can also be viewed as an adapter. The adapter part 49 is shown in detail in FIGS. 7 and 8. The external thread 46 and a second external thread 50 as well as the cone 48 situated on the front side of the adapter part 49 are obvious therefrom. The external thread 50 is used for fastening in the internal thread of the torch body 28 and the external thread 46 is used for fastening the union nut 42. The cone 48 on the front side of the adapter part 49 causes, during the fastening of the contact tube 29 on the threaded pin 49 using the union nut 42, the inlet area 37 to be spread apart, so that the outlet opening 39 is adapted to the diameter of the welding wire 13. The cone 48 on the adapter part 49 and the conical inner surface 47 are adapted to one another in such a way that the outlet opening 39 is adapted to the diameter of the welding wire 13. Of course, the adapter part 49 also has an opening 51 along its longitudinal axis, which is used for the passage of the welding wire 13.

The adapter part 49 does not have to be implemented as an expendable part, but rather is to be viewed as part of the torch body 28 and not as part of the contact tube 29 or an expendable part. The adapter part 49 is thus a type of extension of the torch body 28, which relays the welding current to the contact tube 29 and dissipates the heat of the contact tube 29.

The contact tube 29 according to the invention is shown in FIG. 9, as it is fastened using the union nut 42 on the adapter part 49, and the adapter part 49 is connected to the torch body 28. It is obvious therefrom that the contact tube 29 according to the invention is only fastened using a screw connection on the torch body 28. No additional effort or disadvantage with respect to typical contact tubes 29 and therefore arises in the case of maintenance or replacement.

Figure 12:
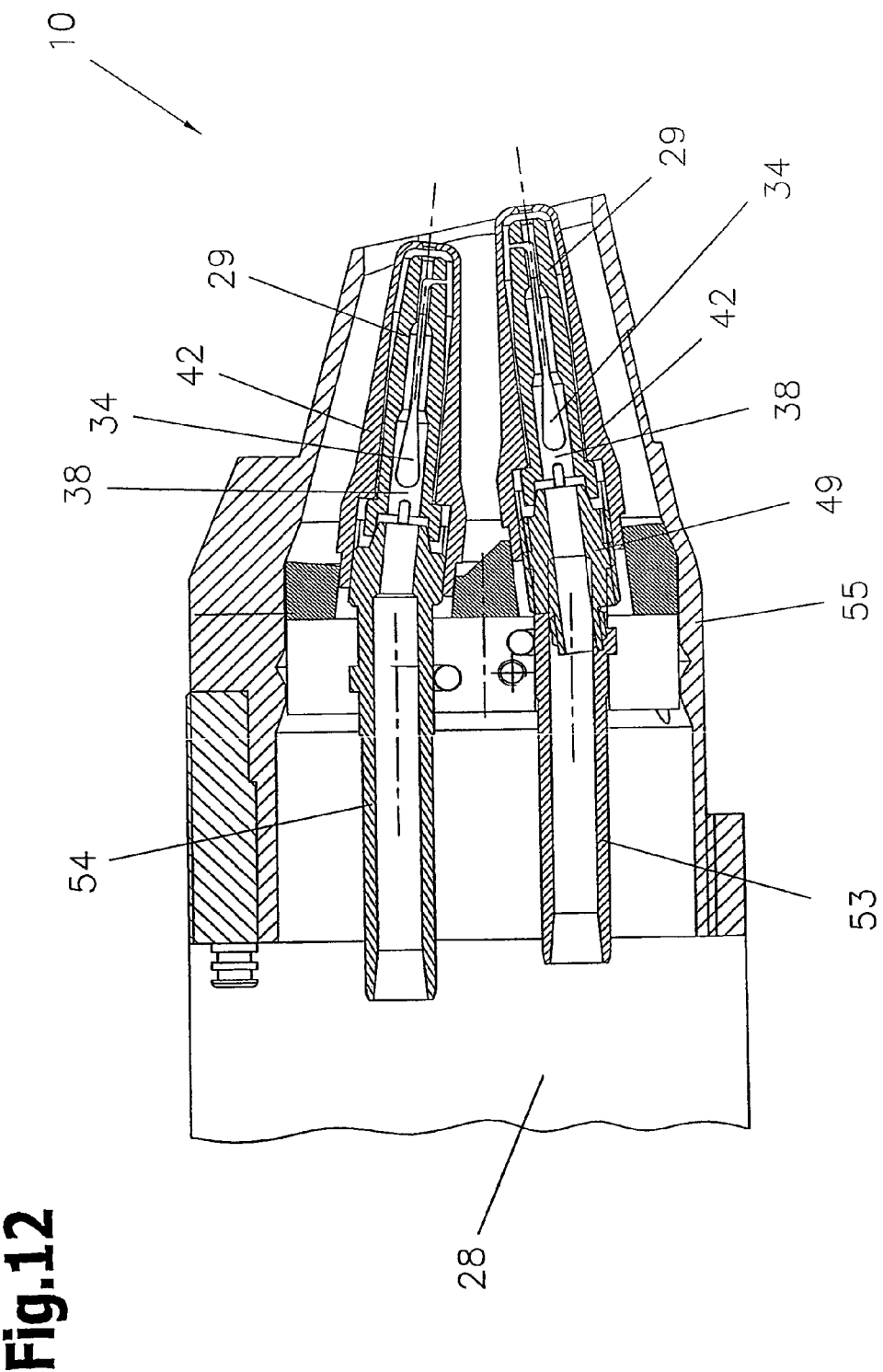
FIG. 12 shows a sectional view of a variant of the contact tubes on a tandem welding torch.
Figure 13:
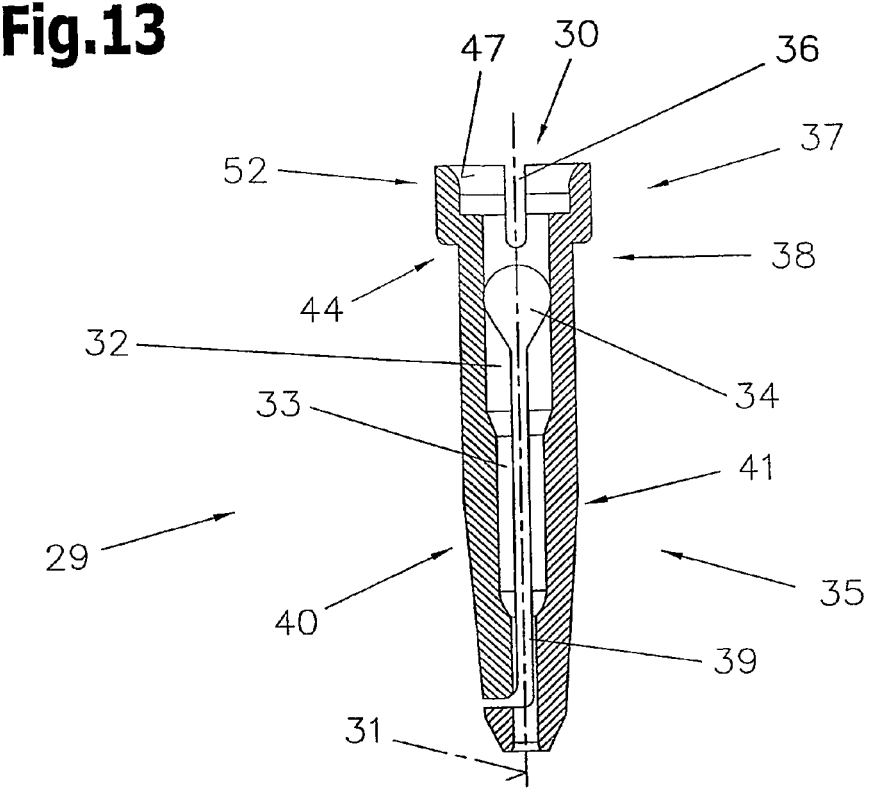
FIG. 13 shows a sectional view of a further embodiment of a contact tube.
Figure 14:
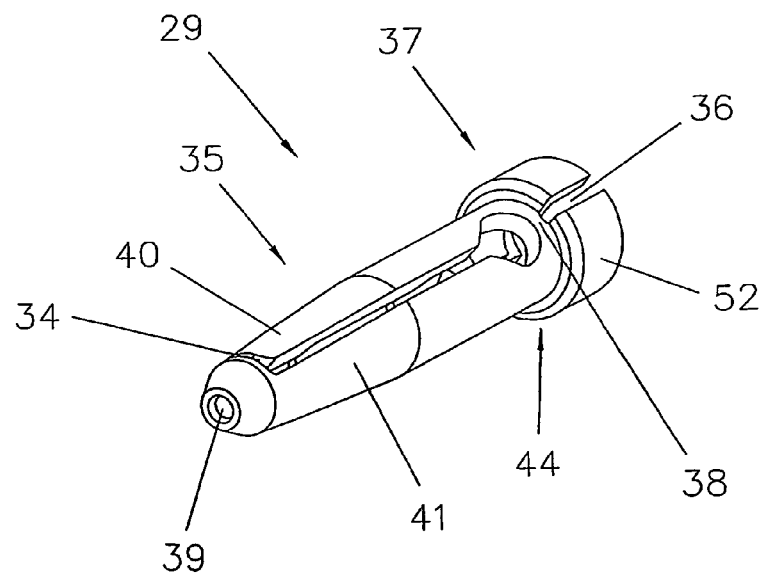
FIG. 14 shows a perspective view of the contact tube according to FIG. 13.

Further embodiments of contact tubes 29 are shown in FIGS. 12 through 14. A so-called tandem welding torch 10 is shown in FIG. 12, which has two contact tubes 29 according to the invention. The contact tubes 29 essentially correspond to the above-described embodiment, which are screwed diagonally into an extension 53 of the torch body 28. A body 54 having a thread can also be implemented, on which the contact tube 29 is in turn diagonally fastened. A union nut 42 which is situated over the outlet area 35 of the contact tube 29 can also be used. The protection from contamination can thus be improved still further. The contact tube 29 is thus essentially enveloped entirely by the union nut 42, only one opening for the welding wire 13 being provided in the union nut 42.

In addition, it is obvious from the contact tubes 29 shown herein that the slot 34 in the outlet area 35 has a club-like form in the area of the web 38. This embodiment of the contact tube 29 is shown in detail in FIGS. 13 and 14. The mobility of the outlet area 35 or the jaws 40, 41 is made easier by the club-like form, since less material is provided in this area. The contact force on the welding wire 13 can also be adapted and/or set and/or influenced by the size of the club-like form of the web 38. A further feature of this embodiment is the curved inner surface 47 of the ring-shaped expansion 52. In this manner, independently of the tightening force of the union nut 42, a contact is always produced between the inner surface 47 and the cone 48 of the adapter part 49. The current transfer and the heat dissipation between torch body 28 and contact tube 29 is accordingly decisively improved and continuously ensured. This is essentially to be attributed to a consistent contact surface, which is also not changed by manufacturing tolerances, but rather at most displaced. The friction force during the fastening of the contact tube 29 to the union nut 42 is also reduced by the curved inner surface 47, so that the defined pre-tension always remains consistent, even during a replacement of the contact tube 29. This can also be provided in the above-described embodiment of the contact tube 29.

In the contact tube 29 according to the invention, the union nut 42 is used as a means for introducing a force onto the contact tube 29, by which the inlet area 37 is spread apart. Through the force, the outlet area 35 or the jaws 40, 41 are compressed, a contact force is exerted on the welding wire 13, and the welding wire is permanently contacted over the entire service life of the contact tube 29. Of course, a corresponding gas nozzle 55 which is known from the prior art is also usable in each case.

In general, it is also to be noted that the contact tube 29 according to the invention essentially causes a constriction of the outlet opening 39, so that during conveyance of the welding wire 13 through the outlet opening 39, a required contact force acts on the welding wire 13. The contact tube 29 is also movable in a defined area, essentially in the outlet area 35, because of the acting force. The jaws 40, 41 are the basic requirement for the mobility of the contact tube 29. The contact force can be adjusted by changing the lever conditions on the contact tube 29. This is performed, for example, by a corresponding configuration of the pivot point (web 38) and the force introduction.

Known grinding out of the outlet opening 39 is also compensated for in the case of the contact tube 29 according to the invention, since in spite of the grinding out caused by the conveyed welding wire 13, permanent contacting of the welding wire is ensured. This is to be attributed to the contact force acting on the welding wire 13 being readjusted. For this purpose, the above-described mobility of the contact tube 29 or the fact that the jaws 40, 41 always attempt to move toward one another is decisive.

The invention claimed is:

1. A contact tube for a welding torch, having a longitudinal axis, along which a continuous opening is provided for guiding a welding wire from an inlet area to an outlet area and from an outlet opening in the direction of a workpiece, at least one outlet slot extending in a longitudinal direction and being provided for contacting the welding wire in the outlet area, wherein at least one inlet slot is provided in the inlet area of the contact tube, which is implemented in one piece, the at least one inlet slot in the inlet area and the at least one outlet slot in the outlet area being situated aligned, and a web, which is used as a pivot point, being formed between the at least one outlet slot in the outlet area and the at least one inlet slot in the inlet area, around which pivot point a movement of the parts of the contact tube situated on both sides of the at least one outlet slot and the at least one inlet slot is made possible so that two outlet parts positioned in the outlet area and separated by the at least one outlet slot move toward each other while two inlet parts positioned in the inlet area and separated by the at least one inlet slot move away from each other, when the contact tube is mounted to a torch body.

2. The contact tube according to claim 1, wherein the at least one outlet slot in the outlet area is situated running along the longitudinal axis up to before the outlet opening of the contact tube and subsequently diagonally to the longitudinal axis, so that two jaws which differ in their shape are formed on both sides of the at least one outlet slot.

3. The contact tube according to claim 2, wherein one jaw is implemented as essentially L-shaped and encloses the outlet opening for the welding wire.

4. The contact tube according to claim 1, wherein a contact area is provided for contacting the welding wire in the outlet area, which contact area is adaptable to the diameter of the welding wire, and the opening is implemented up to the contact area in such a manner that the welding wire can be guided essentially free running from the inlet area up to the contact area in the outlet area.

5. The contact tube according to claim 1, wherein a ring-shaped expansion having an external diameter greater than the remaining external diameter of the contact tube is provided in the inlet area, and a stop surface is implemented on the side of the expansion oriented toward the outlet opening.

6. The contact tube according to claim 5, wherein the inner surface of the ring-shaped expansion is implemented as tapering conically toward the opening to receive a corresponding conical adapter part for fastening on the welding torch.

7. The contact tube according to claim 6, wherein the inner surface of the ring-shaped expansion is implemented as curved.

8. The contact tube according to claim 6, wherein a union nut is provided for fastening the adapter part, so that the inlet area is spread apart by the conical adapter part and as a result of the jaws in the outlet area are moved toward one another.

9. The contact tube according to claim 8, wherein the union nut is situated as a protective envelope over the outlet area.

10. The contact tube according to claim 1, wherein the outlet area is implemented as conically tapering toward the outlet opening.

11. The contact tube according to claim 6, wherein the adapter part has a hole for the welding wire, a cone on one side for use on the conical inner surface, and an external thread on the side diametrically opposite to the cone for connection to the welding torch.

12. The contact tube according to claim 11, wherein an external thread for connection to a corresponding internal thread of the union nut is situated on the side of the cone of the adapter part.

\* \* \* \* \*